Jan. 18, 1927.
J. M. JOHNSON
1,614,744
SPOTLIGHT
Filed August 11, 1924
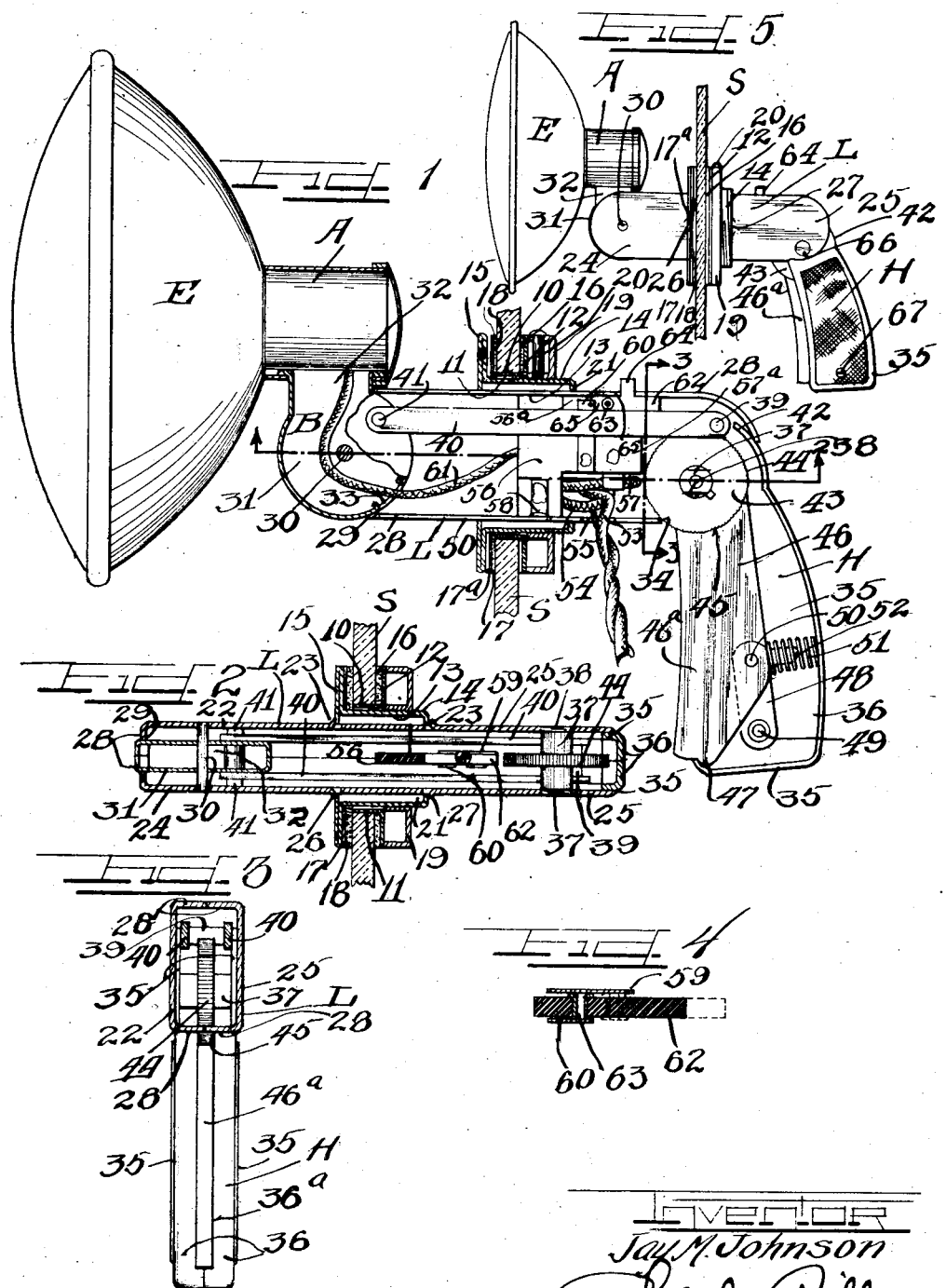

Patented Jan. 18, 1927.

1,614,744

UNITED STATES PATENT OFFICE.

JAY M. JOHNSON, OF CHICAGO, ILLINOIS, ASSIGNOR TO GREAT LAKES AUTO PRODUCTS COMPANY, A CORPORATION OF ILLINOIS.

SPOTLIGHT.

Application filed August 11, 1924. Serial No. 731,269.

This invention relates to spotlights of the type to be mounted in the windshield of a vehicle and has for its object the reduction of the size of the opening in the windshield, the maintenance of the device in its adjusted positions which, in its effective operation, will be substantially automatic, the continued effectiveness of the light in the adjusted positions of the windshield, and the reduction of the cost of manufacture of devices of this character.

With the above and other objects, as will be apparent, this invention consists in the construction, combination and arrangement of parts all as hereinafter more fully described, claimed and illustrated in the accompanying drawings wherein:

Figure 1 is a central longitudinal section of a spotlight constructed in accordance with the present invention, the lamp and socket therefor being shown in elevation.

Figure 2 is a horizontal section taken along staggered line 2—2 of Figure 1 and illustrates the operating and locking mechanism in elevation.

Figure 3 is a vertical section taken along line 3—3 of Figure 1, and shows the handle in elevation and in conjunction with the mechanism whereby the same is locked in its adjusted position.

Figure 4 is a horizontal section through the switch mechanism whereby the operation of the lamp is controlled.

Figure 5 is a side elevation of the present device mounted in a windshield.

Heretofore, in the use of spotlights which are mounted in and are operated through a windshield of an automobile, it has been customary to drill or otherwise pierce the windshield with a relatively large hole and to mount the spotlight in such hole by means of a ball-and-socket connection or by means of a rotary mounting with the lamp pivoted at the outer end and the handle pivoted to the inner end thereof. The size of the hole has obviously increased the liability of windshield breakage, while the mounting of such prior devices has presented considerable difficulty in locking or fixing the lamp in its adjusted position. The present spotlight is primarily designed to reduce the size of the hole and to provide a means for locking the lamp in its adjusted positions which will be substantially automatic in its effective operation and will require no adjustments or care beyond the mere release of the operating handle.

In carrying out the present invention the windshield S is pierced by a comparatively small hole 10 in which is mounted the primary bearing 11, which constitutes a bushing having the outstanding flange 12, formed on one end thereof. The opening through this primary bearing 11 is circular for the reception of the secondary bearing 13 which is exteriorly threaded at one end as at 14, and is provided with an outstanding flange 15 at its other end. After the primary bearing 11 has been placed in the aperture 10 of the windshield S with a composition washer 16 interposed between the flange 12 thereof and the glass, a metallic washer 17 is placed on the body of the secondary bearing 13 and is followed by a composition washer 18 after which the secondary bearing is inserted from the outer side of the shield in the passage of the primary bearing 11 bringing the composition washer 18 into contact with the outer surface of the glass S. A locking ring 19 is then mounted upon the threaded end 14 of the secondary bearing, locking the entire structure to the glass. The fit between the primary bearing 11 and the secondary bearing 13 is such that the latter may freely rotate within the former, the ease and freedom of such rotation being determined by the position of the locking ring 19, it being obvious that the greater the pressure between the ring and the remaining parts the less readily the secondary bearing may be rotated within the primary bearing. When the desired freedom of rotation is arrived at by the adjustment of the locking ring 19 on the threads 14, the position of the ring may be fixed by the set-screw 20 passing through said ring and impinging on the secondary bearing. As the primary bearing 11 is designed to protect the glass of the windshield S against the movement of the secondary bearing 13, it is not intended to move relatively to the glass and is therefore frictionally held against movement by the composition washers 16 and 18. In order that the composition washers may constantly engage the glass and the elements of the primary bearing 11, which also includes the washer 17, to prevent the movement thereof irrespective of the adjusted position of the locking ring 19, the metallic washer 17 is crimped as at 17ª (see Fig. 5) so that it exerts a pressure between the flange 15 of the secondary bearing 13 and the washer 18. By this spring action on the part of the washer 17 the composition washers 16 and 18 are constantly in contact with the glass between the metallic washer 17 and the flange 12 of the primary bearing 11, within the range of adjustments of the locking ring 19.

The secondary bearing 13 is provided with a rectangular passage 21 through which extends the lamp stem L which is hollow and rectangular in cross section. One side 22 of this lamp stem is continuous and constitutes a stamping with outwardly extending ears 23 which respectively engage the outer face of the flange 15 of the secondary bearing 13 and the terminal of the threaded portion 14 thereof, so that the secondary bearing is fixed to the stem L. The opposite side of the lamp stem is formed in two sections 24 and 25; the forward section 24 extends through and terminates at the end of the threaded portion 14 of the bearing 13 and is provided with an outstanding ear 26, which like one of the ears 23 engages the outer face of the flange 15 of the secondary bearing 13. The remaining section 25 of this side of the stem L extends from the terminal of the threaded portion 14 of the secondary bearing 13 to the plane of the end of the opposite side 22 of the stem and at its end adjoining the bearing 13 is provided with an outstanding ear 27 which, like the opposed ear 23 of the side 22 of the stem, engages the terminal of the threaded portion 14 of the bearing 13. These sides 22 and 24—25 of the stem are formed from stampings and the sections 24 and 25, combined form a side which coacts and mates with the side 22 to create the stem L in its entirety and to constitute a housing for the mechanical and electrical controlling parts of the light. It will also be observed that the side 22 of the stem and the sections 24 and 25 which combine to form the side of the stem L opposed to the side 22, all have inwardly extending edge flanges 28 which abut at their edges when the various sides of stem are assembled to form the housing as aforesaid, and to create the lamp stem when attached together as will hereinafter be described.

At the outer end of the stem L, the end flanges and bottom flanges 28 of the side 22 and the section 24 of the side opposed thereto are cut away as at 29, to provide for the proper mounting of the lamp E and the movement thereof. Pivoted between the outer ends of the side 22 and the section 24 of the opposite side of the lamp stem L by the pin 30, which passes through the side 22 and the section 24, is a lamp bracket B. This bracket B comprises a hollow cylindrical base 31, the outer surface of which operates in the cutaway portion 29 of the flanges 28 of the stem L, and closes the opening created thereby. The lamp socket A is secured to the base 31 by means of the hollow shank 32 fixed to or formed from the base 31 and rigidly attached to the socket A as shown in Figure 1. To provide for the extension of the circuit to the socket A, the base 31 of the bracket B, has an aperture 33 in the peripheral wall thereof located within the confines of the stem L irrespective of the position of the bracket B. Because the bracket B may freely oscillate about the pivot pin 30, within the limits of its movement, and further because the secondary bearing 13 carrying the stem L may rotate within the primary bearing 11, the lamp E, may be adjusted to any position in a range of 180° on the exterior of the shield S.

At the opposite end of the lamp stem L, to the lamp E is pivotally mounted the handle H, the same being positioned between the rear extremity of the side 22 and the rear end of the section 25 of the side opposed thereto, and for that purpose the flanges 28 of these elements are cut away as at 34, to provide a slot extending from a point just above the horizontal axis of the end of the stem L, to and into the under side thereof, in which the handle may be swung to adjust the lamp as will be hereinafter described.

This handle H comprises two side pieces 35, each having an inwardly extending flange 36 on all of its edges except at the upper end; the flanges of one side piece being designed to abut against the flange of the companion side piece for the purpose of forming a hollow pistol grip handle when the side pieces are secured together.

At the upper end of the handle H is a fixed pivot pin 37, upon which the handle is mounted for a free oscillation and the ends of which are faced as at 38 for reception in a similar shaped aperture in the adjoining ends of side 22 and the side section 25, whereby the pin 37 is held from movement and the handle H is mounted for oscillation within the limits of the slot 34.

At its upper end and just above the pivot pin 37, the sides 35 of the handle H are connected by a pin 39, each end of which is reduced to first receive the rear apertured end of a link 40 and to be then received in an aperture in the upper end of the adjacent side 35 of said handle. Thus it will be seen that two links 40 are provided; one adjoining each side of the stem L and pivotally connected to the upper end of the handle H between the side pieces 34 thereof. At their forward ends these links 40 are connected by the pin 41 to the base 31, of the lamp bracket B upon each side thereof adjoining its periphery and above the horizontal diameter thereof. From this construction it will be seen that as the handle H is oscillated within the limits of the slot 34, a corresponding or similar movement will be imparted to the lamp bracket B within the limits of the cutaway portions 29, through the medium of the links 40.

The upward movement of the lamp E under the influence of the handle H is limited by the ends of the flanges 28 forming the upper side of the lamp stem L, while its downward movement is limited by flanges 28 upon the upper side of the lamp stem L and adjoining the handle H. The outer flanges 35 of the handle H are curved outwardly and inwardly at their upper ends to form the lips 42, which extend under the downwardly curved rear terminals of the flanges 28 forming the upper side of the lamp stem L, and the latter contact with the junction between the lips 42 and the body of flanges 36 to form a stop for the upward movement of the handle H and thus limit the downward movement of the lamp E. The cooperation between the lips 42 and the downwardly curved rear terminals of the flanges 28 forming the upper side of the lamp stem L also guides the handle H in its movement and forms a seal or closure for the opening which otherwise would exist between the lamp stem L and the handle H, at certain adjusted positions of the handle.

Thus it will be seen from the foregoing that the lamp stem L has a rotary movement in the hole in the windshield S, while the lamp E, located on the exterior of the shield S may be swung by the handle H on the interior of said shield, to any position within a range of 90° without moving the stem L and that by utilizing the rotary movement or adjustment of the latter the range of adjustment of the lamp E is doubled.

In order to retain the lamp E in its adjusted positions to which it may be moved by the handle H, relative to the stem L, a disk 43 is keyed to the pin 37 between the side pieces 35 of the handle H and below the pin 39 by means of which the links 40 are secured to the handle H. Inasmuch as the pin 37 is held from rotation by the cooperation of the squared ends 38 thereof with the similarly shaped apertures in the side 22 and the side section 25, this disk 43 is likewise held from movement. The outer surface of this disk 43 is provided with a plurality of small uniform teeth 44 which coact with similarly formed teeth in the upper arcuate surface 45 of a trigger 46. This trigger constitutes a bar mounted for movement within the handle H and designed to project outwardly through a slot 36ª in the flanges 36 on the inner side of said handle, the projection through said slot being limited by the teat 47 formed on the lower end of the trigger 46 and designed to contact with the flanges 36 at the lower end of the slot 36ª through which a portion 46ª of the trigger projects. The arcuate surface 45 at the upper end of this trigger 46 coincides with and follows the contour of the disk 43, and as before pointed out, has a series of relatively small uniform teeth which, when the trigger is in its operative position with the portion 46ª thereof projecting through the slot 36ª in the flanges 36 on the inner side of the handle, engage the teeth 44 of the disk 43 and lock the handle H and consequently the links 40, lamp bracket B and lamp E, from movement relatively to the lamp stem L.

The trigger 46 usually occupies its operative position, i. e. with the portion 46ª projected through the slot 36ª in the flanges 36 in the handle H and with the teeth of the arcuate end 45 thereof engaging the teeth 44 of the disk 43. To maintain the trigger 46 in this position when uninfluenced, a toggle link 48 is pivoted between the lower ends of the side pieces 46 of the handle H on the pin 49; said toggle link 48 being also pivoted at 50 to the trigger 46 adjoining its lower end and at a point removed from the projecting portion 46ª thereof. A coil spring 51 is interposed between outer flanges 36 of the handle H and the rear edge of the trigger 46, being held from displacement by the stud 52 formed on the toggle link 48 which enters the coil of said spring.

The action of the spring forces the teat 47 against the flanges 36 at the lower end of the slot 36ª in which the trigger operates and projects the portion 46ª of said trigger from the handle H, thereby bringing the toothed arcuate end 45 of said trigger into locking engagement with the teeth of the disk 43. When it is desired to move the handle H to adjust the lamp E as aforesaid, the grasping of the handle by the hand of the operator and exerting a pressure on the projecting portion 46ª of the trigger 46 causes said trigger to be moved against the pressure of the spring 51 toward the unslotted flanges 36 of the handle H; thus the projecting portion 46ª thereof retreats into the handle H, thereby disengaging the teeth of the arcuate end 45 of said trigger from the teeth 44 of the disk 43. A swinging movement of the handle about the pin 37 then permits the lamp E to be adjusted, as heretofore described, and when the desired adjustment has been attained the release of handle H by the operator permits the spring 51 to act immediately bringing the teeth of the arcuate end 45 of the trigger 46 into engagement with the teeth 44 of the disk 43, locking the handle H, links 40, lamp bracket B and lamp E in their adjusted positions.

To provide for the electrical control of the light in the lamp E, the two wires 53 and 54 are brought into lamp stem L through an opening 55 located in the under flanges 28 of the side 22 and the side section 25 just in advance of the handle H and to the rear of the secondary bearing 13. A fiber block 56 is fixed in the stem L between the links 40 and extends from the lower flanges 28 to the upper flanges 28, being cut away at 57 and 56ª above the opening 55 to create the extension 57ª. The wire 54 is attached to terminal strip 58 in the fiber block 56 which in turn is in contact with the adjoining under flanges 28 of the stem L to form one side of the lamp circuit; the light used being a single contact lamp of standard construction and having one side thereof in circuit with the stem L. The remaining wire 53 attaches to a terminal plate 59 on the opposite side of the block 56 to the terminal strip 58 and a second terminal strip 60 also carried by the block 56. This second strip 60 is connected to the light contact by the wire 61 which passes through the aperture 33 to the interior of the bracket B and thence through the shank 32 to the lamp socket A where it connects with the single contact of the lamp.

Both the terminal strip 60 and the plate 59 project above the upper edge of the extension 57ª formed by the second cutaway portion 56ª of the fiber block 56, whereby a fiber switch plug 62 may be mounted for reciprocating movement between the strip 60 and plate 59, to bring the contact rivet 63 into and out of connection with the strip 60, said rivet always bearing against the plate 59. This contact rivet 63 pierces the switch block 62 and the ends thereof are so arranged that one constantly bears against the plate 59 and the other may be brought into contact with strip 60 to establish electrical connection with the plate 59 by the sliding of the block 62 on the edge of the extension 57ª.

The manipulation of the switch block 62 is accomplished by the finger piece 64 formed on the block 62 and protruding through a slot 65 in the upper flanges 28 of the stem L to the rear of the secondary bearing 13.

Manifestly, the movement of the switch block 62 forwardly under the influence of the finger piece 64, the plate 59 and strip 60 will be electrically connected by the rivet 63 to close the circuit from wire 54, to the lamp stem L, bracket B, lamp socket A, lamp E, wire 61, strip 60, rivet 63, plate 59 and wire 53. The rearward movement of the block 62 breaks this circuit.

After the entire device is assembled and the side pieces 35 of the handle H are in place, the entire structure is held together by the screw 66 passing through the side section 25 of the stem L, and threaded in to the end of the pin 37. The handle side piece 35 which is removable from the pins 49 and 37 is held in place by the screw 67 which is threaded into the terminal of the pin 49.

While the preferred form of the present invention is disclosed, it is to be understood that changes may be be made in the details of construction and arrangement thereof, without departing from the spirit and scope hereof.

What is claimed:

1. In a spotlight, the combination with a bearing, of a lamp stem fixed therein, a lamp pivoted to one end of said stem but offset above it whereby to tilt in a vertical plane, a trigger handle similarly pivoted to the opposite end of said stem and projecting downwardly therefrom, connections between the handle and the lamp whereby the movement of the former about its pivot will cause a movement of the latter about its pivot in a vertical plane, and locking means at the upper part of the trigger handle and operable upon the release of the handle for retaining it and the lamp in adjusted position.

2. In a spotlight, the combination with a primary bearing, of a secondary bearing mounted for rotary movement therein, means for adjusting the frictional engagement between said bearings, a lamp stem fixed in the secondary bearing, a lamp pivoted to one end of said stem but offset above it whereby to tilt in a vertical plane, a trigger handle similarly pivoted to the opposite end of said stem and projecting downwardly therefrom, connections between the handle and the lamp whereby the movement of the former about its pivot will cause a movement of the latter about its pivot in a vertical plane, and locking means at the upper part of the trigger handle and operable upon the release of the handle for retaining it and the lamp in adjusted positions.

3. The combination with a lamp stem, of a lamp pivotally mounted at one end thereof, a handle pivoted to the other end thereof, connections between said handle and said lamp whereby movement of the former swings the latter relatively to said stem, and means for locking the elements in their adjusted positions comprising a toothed disk carried by said stem, and a trigger pivoted to said handle to engage the teeth of the disk aforesaid.

4. The combination with a lamp stem, of a lamp pivoted thereto, a handle carried by said stem, connections between said lamp and said handle whereby the movement of the latter adjusts the former relatively to said stem, a trigger bar mounted in said handle and adapted to be partially projected therefrom when said trigger is in its locking position, said trigger having teeth at one end thereof adjoining the lamp stem, and a toothed member fixed to the stem adjoining said handle relative to which the handle swings and with the teeth of which the toothed end of the trigger cooperates to lock the elements in their adjusted positions when the trigger partially projects from the handle.

5. The combination with a lamp stem, of a lamp pivoted thereto, a handle carried by said stem, connections between said lamp and said handle whereby the movement of the latter adjusts the former relatively to said stem, a disk fixed within the terminal of the stem adjoining the handle and partially projecting into said handle, teeth on the periphery of said disk, a toggle bar pivoted in the outer end of the handle, a trigger bar pivoted to the free end in said toggle bar, said trigger having a toothed arcuate surface in its upper end, and a spring interposed between the handle and the edge of the trigger for forcing the teeth of the trigger into engagement with the teeth of the disk.

In testimony whereof I have hereunto subscribed my name.

JAY M. JOHNSON.